Patented May 31, 1949

2,471,785

UNITED STATES PATENT OFFICE 2,471,785

COPOLYMERS OF VINYL AROMATIC COMPOUNDS

Raymond B. Seymour and John Mann Butler, Dayton, Ohio, assignors to Monsanto Chemical Company, St. Louis, Mo., a corporation of Delaware No Drawing. Application June 21, 1944, Serial No. 541,466

11 Claims. (Cl. 260—74)

The present invention relates to copolymers of vinylbiphenyls, particularly to copolymers of vinylbiphenyls with vinyl-substituted benzenes, and to a method of producing the same.

An object of the invention is to provide for the plastics and coating industries new resinous materials of improved mechanical strength and heat-resistance. Another object of the invention is to prepare new, resinous materials by interpolymerization of vinylbiphenyl with a vinyl-substituted benzene compound in the presence or absence of other compounds having an olefinic double bond. Another object is to provide polymeric vinylbiphenyls.

These and other objects which will be hereinafter disclosed are provided by the following invention wherein a vinylbiphenyl compound, i. e., ortho-, meta- or para-vinylbiphenyl or an isomeric mixture of the same or a vinylchlorobiphenyl or a vinylfluorobiphenyl, is subjected to polymerizing conditions in the presence of a vinylidene-substituted benzene compound, for example, styrene, its nuclearly substituted derivatives such as ortho-, meta- or para-chloro or fluoro styrenes, ortho-, para-, meta-methyl or ethylstyrene, and the chain-substituted styrenes such as alpha-methylstyrene, alpha,para-dimethylstyrene. In the monomeric mixture of the vinylbiphenyl compound and the vinylbenzene compound there may also be present at least one other compound having an olefinic double bond (>C:C<) or preferably a vinyl group (—CH:CH$_2$)

A great many interpolymers of styrene or its derivatives are already known, such interpolymers having been prepared with the object of modifying polystyrene in such a manner as to retain its good properties of clarity, low moisture absorption and favorable electrical properties, while improving its mechanical and heat resisting properties. However, as far as we have been able to ascertain until now, no interpolymer of styrene has been developed which possesses very good mechanical and thermal properties in combination with very good clarity, good electrical properties and low moisture absorption. For example, interpolymers of styrene with the methacrylates generally have lower heat distortion, higher moisture absorption and poorer electrical properties than does polystyrene. In the interpolymers of styrene with acrylonitrile the heat distortion point has been increased to a small degree but heat-stability, moisture resistance and electrical properties are poor. Interpolymers of styrene and methyl isopropenyl ketone have poorer mechanical properties and less stability to heat and light than does polystyrene. Heteropolymers of styrene, for example, with maleic anhydride, are soluble in dilute aqueous alkali. Cross-linked interpolymers of styrene, for example, interpolymers of styrene with compounds such as diallyl adipate or divinylbenzene are not thermoplastic. In this case high heat resistance is obtained at the sacrifice of moldability.

We have now found that when styrene or nuclear and/or chain substituted derivatives thereof are polymerized with one or more of the present monomeric vinylbiphenyl compounds there are obtained resinous materials which possess better thermal properties than does polystyrene and in which the high degree of clarity, moisture resistance and electrical properties of polystyrene have been retained. The mechanical strength of our new copolymers at room temperature is substantially that of polystyrene; however, at elevated temperatures our new copolymers are considerably stronger than polystyrene. Moreover, the new copolymers are readily plasticized, whereas polystyrene is plasticizable only with difficulty, if at all.

Mixtures of styrene and vinylbiphenyl are polymerizable in all proportions. As little as 5% by weight of ortho- or para-vinylbiphenyl interpolymerized with 95% of styrene will show an increased heat distortion point over that of polystyrene and an improved resistance to the solvent action of gasoline. Binary interpolymers containing between 5% and 95% by weight of vinylbiphenyl, the balance being styrene may be readily prepared. As little as 5% by weight of styrene interpolymerized with 95% of vinylbiphenyl will decrease the brittleness of polyvinylbiphenyl.

Particularly valuable products are obtainable from ternary or polynary mixtures comprising at least one of the present vinylbiphenyls, at least one vinylbenzene compound and one or more other unsaturated compounds, particularly vinyl compounds. There may be employed, for example, ternary mixtures consisting of para-vinylbiphenyl, styrene and acrylonitrile; para-vinylbiphenyl, styrene and alpha,para-dimethylstyrene; para-vinylbiphenyl, styrene and methyl methacrylate, etc. The use of the present vinylbiphenyls with such generally employed pairs of interpolymerizable compounds as styrene and acrylonitrile or styrene and methyl methacrylate imparts a simultaneous plasticizing and heat-stabilizing effect so that in a great many cases ternary or polynary polymers are obtained which possess better thermal, mechanical and solvent resistant properties than do the corresponding binary copolymers which have been prepared in the absence of vinylbiphenyls.

Ternary polymers may be prepared by introducing the third copolymerizable material containing a polar group such as acrylonitrile or methyl methacrylate into the binary systems described above. Where a third vinyl compound is introduced for the purpose of still further increasing the plasticizability of the resin it may advantageously be employed so as to constitute in amount from 5% to 30% by weight of the total polymer. Such polymers are made by adding to the binary mixture of monomeric materials, an amount either of acrylonitrile or methyl methacrylate, so that the latter comprises from 5% to 30% of the mixture. The mixture is then polymerized as herein described.

Valuable resinous products are obtained by polymerization of a mixture of one or more of the present vinylbiphenyls, a styrene compound and also a compound containing at least two olefinic double bonds, for example, diallyl succinate, or divinylbenzene. Cross-linked non-rubbery polymers are thus produced which, while not moldable, are distinguished by a very high degree of solvent-resistance, heat-stability and mechanical strength. They may be employed for the production of cast objects.

Interpolymerization of a vinylbiphenyl with a styrene compound, either in the presence or absence of another compound containing an olefinic double bond, may be conducted by any of the known polymerizing procedures, i. e., by mass polymerization, emulsion polymerization, suspension polymerization, polymerization in solution, etc., in the presence or absence of catalysts of polymerization. The vinylbiphenyl participates readily in the reaction, the polymerization time for mixtures of vinylbiphenyl and styrene, for example, usually being less than that required for substantially complete polymerization of styrene at like temperatures.

The hard, clear, transparent and substantially colorless interpolymers obtainable by copolymerization of the vinylbiphenyls with a styrene compound are valuable as molding or casting resins, or as glass substitutes for the manufacture of automobile windshields, airplane turrets, sound records, dentures, etc. The binary interpolymers, being pure hydrocarbon resins, have very good dielectric properties, and because of their good heat resistance they may be advantageously employed as electrical insulating materials in applications requiring high stability to heat, for example, as solid dielectrics in transformers or capacitors, or in radio coil forms and supports, etc. Solutions of the interpolymers may be employed for coating electrical conductors, or the copolymers may be extruded as a coating upon wires or cables. The interpolymers may also be employed in the preparation of laminated or impregnated electrical insulating agents. For example, the finished interpolymer in granular form may be compression molded with alternate layers of a fibrous material such as asbestos and glass fibers, or films of the interpolymer may be sandwiched between layers of fibrous materials and the whole subsequently molded by the use of heat and pressure. The partially copolymerized material may also be used for the manufacture of the laminates or as a bonding for dielectric particles such as mica, the copolymerization being completed in situ.

The invention is further illustrated, but not limited, by the following examples:

Example 1

A mixture consisting of 60 parts by weight of styrene and 40 parts by weight of para-vinylbiphenyl was heated for a period of 4 days at a temperature of 100° C. and then for one day at a temperature of 125° C. The resulting hard, transparent resin which was substantially colorless had a softening point of 138° C., a melting point of 243° C., a heat distortion point of 99° C., and an alcohol-soluble content of 1.0%. On the other hand, a similarly prepared polystyrene had a softening point of 118° C., a melting point of 225° C., a heat distortion point of about 74° C. and an alcohol-soluble content of 2.1%. For both the copolymer and the polystyrene the softening points and the melting points were determined on the copper Maquenne bar and the heat-distortion points were determined by the procedure given in the American Society for Testing Materials, Specification D648-41T, found in the American Testing Materials Book of Standards for 1942 on page 1060.

When a 0.125 inch thick strip of the molded interpolymer was immersed in boiling water and held there for 10 minutes there was no apparent distortion, while under the same conditions the polystyrene was badly distorted.

Compression molded test specimens of the copolymer showed the following mechanical properties.

Tensile strength_____ 6,300 p. s. i.
Flexural strength_____ 10,100 p. s. i.
Impact strength_____ 0.025 ft. lb./0.1" of notch The above value for tensile strength was determined on a Scott J-2 tester using compression molded tensile specimens with a 1.5" straight section in the center, the cross section of the straight portion being 0.1" x 0.5". The Scott J-2 tester was used with a cross-head speed of 1" per minute.

The above value for flexural strength was determined by employing a compression molded strip measuring 0.2" x 0.5" x 2" and a model J-2 Scott tester, which tester had been modified by a special support having curved edges with a radius of 0.0625" and spaced at a distance of 0.625", the test strip being laid flat on said supports. The span:thickness ratio was 8:1, and the cross-head speed was 1" per minute.

Evaluation of the impact strength was made on compression molded strips measuring 0.1" x 0.5" x 2". These strips were notched in the manner described in the American Society for Testing Materials, Specification No. D256-41T and found on pages 339 to 342 of the American Society for Testing Materials, Book of Standards, 1941 Supplement, volume III. The notched strips were tested in the Standard Bell Telephone Model, Izod Impact Tester.

Upon injection molding on a hand-operated

Loomis press at a temperature of 390° F. the copolymer flowed smoothly to give clear, colorless, strain-free moldings. Ortho-, meta- or para-monochlorostyrene may be substituted in whole or in part for styrene in the above example.

Example 2

A mixture consisting of 70 parts by weight of styrene and 30 parts by weight of para-vinylbiphenyl was polymerized in a sealed tube for 40 hours at a temperature of 70° C. and then for 7 days at a temperature of 100° C. At the end of this time there was obtained a hard, clear, colorless resin having a softening point of 143° C., a melting point of 220° C. and an alcohol-soluble content of 3.7%. A molding powder was prepared by dissolving the interpolymer in benzol and precipitating the dissolved resin by pouring the solution into alcohol. Compression molded test specimens prepared from the purified interpolymer showed the following properties as compared to a similarly prepared polystyrene:

|  | Interpolymer | Polystyrene |
|---|---|---|
| Impact Strength, ft. lb./0.1" of notch | 0.023 | 0.022 |
| Elongation, per cent | 3.5 | 2.0 |
| Heat Distortion Point °C | 94 | 74 |

The above values were obtained by the methods described in Example 1.

In the copolymer of the present example there has been obtained increased heat-stability and an increased elongation without sacrifice of impact strength or moldability. Both the compression molded and injection molded specimens of the copolymer are smooth, clear and colorless. Ortho-, meta- or para-monofluorostyrene may be substituted in whole or in part for styrene in the above example.

Example 3

This example illustrates the emulsion copolymerization of styrene with vinylbiphenyl. 45 g. of styrene and 5.0 g. of vinylbiphenyl (9:1 ratio) were added to the emulsifying medium consisting of 66 g. of water, 0.42 g. of sodium perborate, 1.65 g. of Gardinol WA (technical lauryl sulfate), 1.5 g. of carbon tetrachloride, 0.72 g. of disodium phosphate and 0.114 g. of citric acid. The resulting emulsion was shaken for 3 days at a temperature of 35° C., and at the end of this time the reaction mixture was poured into alcohol. Upon drying and molding the precipitated copolymer there was obtained a hard, clear, colorless piece having a heat distortion point of 83° C. as determined by the American Society for Testing Materials procedure, referred to in Example 1.

Example 4

A mixture consisting of 70 parts of styrene, 15 parts of para-vinylbiphenyl and 15 parts of acrylonitrile was mass polymerized for 88 hours at a temperature of 70° C. and then for 3 days at a temperature of 100° C. There was thus obtained a clear, hard resin having a softening point of 134° C. and a melting point of 220° C. It was soluble in dioxane, benzene, ethyl acetate, ethylene dichloride and 2-nitropropane and insoluble in gasoline and carbon tetrachloride. The copolymer gave clear, practically colorless compression moldings having the following properties:

Tensile strength _____ p. s. i__ 7,160
Flexural strength _____ p. s. i__ 16,000
Heat distortion point _____ °C__ 92

The above values were determined by employing the evaluation procedures described in Example 1. The present copolymer differs essentially from styrene-acrylonitrile copolymers in that the added vinylbiphenyl content of the former imparts heat-resistance to the copolymer without sacrifice of color stability. Methyl methacrylate may be substituted for acrylonitrile in the above example.

Example 5

A mixture consisting of 35 parts by weight of styrene, 35 parts by weight of alpha,para-dimethylstyrene, 15 parts of para-vinylbiphenyl and 15 parts of acrylonitrile was mass polymerized for 88 hours at a temperature of 70° C. and then for 3 days at a temperature of 100° C. The copolymer which is obtained has a softening point of 119° C. and a melting point of 228° C. It is soluble in dioxane, benzene, acetone, ethylene dichloride and 2-nitropropane, insoluble in gasoline and swollen in carbon tetrachloride. It is readily molded to give clear, colorless objects of good mechanical strength. Ortho-, para-, meta-, ethyl- or methylstyrene may be substituted for the alpha,para-dimethylstyrene in the above example.

Example 6

This example shows the effect of styrene on para-vinylbiphenyl and the heat distortion properties of the resulting copolymers. Monomer mixtures containing the quantities of styrene and para-vinylbiphenyl given below were mass polymerized for 4 days at a temperature of 100° C. and then for 1 day at a temperature of 125° C. The resulting copolymers were then tested for heat distortion. The following values for heat distortion points were thus obtained for the various copolymers:

| Percent Styrene | Percent p-Vinylbiphenyl | Heat Distortion Point, °C. |
|---|---|---|
| 100 | 0 | 75 |
| 90 | 10 | 80 |
| 80 | 20 | 86 |
| 70 | 30 | 93 |
| 60 | 40 | 102 |
| 50 | 50 | 106 |
| 40 | 60 | 109 |
| 20 | 80 | 116 |

That para-vinylbiphenyl has a definite effect on increasing heat-resistance is shown by the fact that the heat distortion points of copolymers prepared from it and styrene rise with increasing concentration of the biphenyl compound.

Example 7

Separate mixtures of styrene with ortho-, meta- and para-vinylbiphenyl in the proportions of 60% styrene and 40% of the vinylbiphenyl were polymerized at 70° C. for 2 days, 100° C. for 2 days and 125° C. for 1 day. The products were hard, clear resins. The softening point, melting point and heat-distortion points on these resins were as follows:

| Styrene, percent | Vinylbiphenyl, percent | Softening Point, °C. | Melting Point, °C. | Heat Distortion Point, °C. |
|---|---|---|---|---|
| 60 | 40 ortho | 138 | 200 | 109 |
| 60 | 40 meta | 110 | 208 | 80 |
| 60 | 40 para | 140 | 237 | 102 |

Example 8

Vinylbiphenyl may itself be polymerized. A mixture of isomers of ortho-, meta- and para-vinylbiphenyl was heated for 2 days at 70° C., then for 2 days at 100° C. and finally at 125° C. for 1 day. A hard, somewhat brittle, clear material was formed which could be molded to give clear moldings.

A sample of pure para-vinylbiphenyl was heated for 2 days at 70° C., then 2 days at 100° C. and then at 125° C. for 1 day. A somewhat brittle, clear, moldable resin was obtained having a softening point of 158° C. and a melting point of 220° C. The material was poly-para-vinylbiphenyl.

A sample of pure meta-vinylbiphenyl was polymerized as above. A brittle, clear resin having a softening point of 103° C. and a melting point of 173° C. was obtained. This material was poly-meta-vinylbiphenyl.

A sample of pure ortho-vinylbiphenyl was polymerized as above. The material was poly-ortho-vinylbiphenyl. It had a softening and a melting point above that of the poly-meta-vinylbiphenyl.

Example 9

100 g. of a mixture containing 70 parts by weight of monomeric styrene and 30 parts by weight of 2-fluoro-4'-vinylbiphenyl was heated for 3 days at 70° C., then 2 days at 100° C. and then for 1 day at 125° C. A clear, colorless resin was produced having a softening point of 120° C. and a melting point of 240° C. The product was moldable.

Example 10

100 g. of 2-fluoro-4'-vinylbiphenyl was heated under the same conditions as employed in Example 9. A clear, colorless and hard resin was obtained, having a softening point of 120° C. and a melting point of 193° C. Chlorovinylbiphenyl may be substituted for the fluorovinylbiphenyl and a moldable resin obtained.

Example 11

100 g. of a mixture consisting of 50 parts of monomeric styrene, 30 parts of monomeric para-vinylbiphenyl and 20 parts of monomeric acrylonitrile was polymerized by heating in mass for 2 days at 70° C. and then for 1 day at 100° C. The resulting clear, hard interpolymer was dissolved in dioxane, and the resulting solution poured into methyl alcohol. The interpolymer was precipitated as a fine powder which was removed from the alcohol and dried. The powder was molded in a heated die. Samples of the molded interpolymer were tested and found to possess the following properties:

| | |
|---|---|
| Tensile strength | 6,600 p. s. i. |
| Flexural strength | 13,600 p. s. i. |
| Impact strength | 0.31 ft. lb./1" of notch |
| Heat distortion point | 105° C. |

Polymerization may also be carried out in suspension or emulsion or in solution and in the presence or absence of polymerization catalysts such as benzoyl peroxide, acetyl peroxide or other oxygen liberating polymerization catalysts. Instead of employing para-vinylbiphenyl as in the above examples there may be used ortho-vinylbiphenyl or meta-vinylbiphenyl or isomeric mixtures of the same. Styrene may be partially or wholly substituted by any of its polymerizable or copolymerizable homologs. While the mass polymerizations disclosed above were conducted in the absence of a catalyst of polymerization, such catalysts may be employed and polymerization will take place at somewhat lower temperatures than in the absence of catalysts. As hereinbefore stated, the copolymerization may also be effected in solution, in emulsion or in suspension. Moreover, polymerization may be carried out in molds in order to produce cast objects, either the initial monomeric mixture or the partially polymerized material being poured into the molds, in the presence or absence of a wetting agent, or mold lubricant, etc., and the polymerization completed within the molds. Temperatures of from 70° C. to 125° C. may be employed for conducting the polymerization. When the copolymers are intended for use as impregnating agents or textile stiffening or sizing agents, polymerization may likewise be brought about in situ, i. e., the textiles may be impregnated with either the monomeric mixture or the partially polymerized, viscous polymer and the subsequent polymerization carried to completion upon the surface of the textile or within the fibrous structure itself. The material may also be applied as a latex obtained by emulsion polymerization.

While the invention has been described with particular reference to specific embodiments, it is to be understood that it is not to be limited thereto, but is to be construed broadly and restricted solely by the scope of the appended claims.

What we claim is:

1. An interpolymer comprising a biphenyl compound selected from the class consisting of vinylbiphenyl, vinylchlorobiphenyl and vinylfluorobiphenyl copolymerized with a compound selected from the class consisting of styrene, alpha-methylstyrene and alpha,para-dimethylstyrene, said vinylbiphenyl compound comprising from 5% to 95% by weight of said interpolymer and said other compound comprising at least 5%.

2. An interpolymer comprising copolymerized para-vinylbiphenyl and styrene, said interpolymer containing between 5% and 95% by weight of copolymerized para-vinylbiphenyl and at least 5% of copolymerized styrene.

3. An interpolymer comprising copolymerized ortho-vinylbiphenyl and styrene, said interpolymer containing between 5% and 95% by weight of copolymerized ortho-vinylbiphenyl and at least 5% of copolymerized styrene.

4. An interpolymer comprising copolymerized meta-vinylbiphenyl and styrene, said interpolymer containing between 5% and 95% by weight of copolymerized meta-vinylbiphenyl and at least 5% of copolymerized styrene.

5. An interpolymer consisting of 5 to 95% of copolymerized para-vinylbiphenyl and from 5 to 95% of copolymerized styrene.

6. An interpolymer of 5 to 95% styrene, 5 to 95% vinylbiphenyl and 5 to 30% acrylonitrile, said percentages being based upon the total polymeric content of the interpolymer.

7. An interpolymer of 5 to 95% styrene, 5 to 95% vinylbiphenyl and 5 to 30% methyl methacrylate, said percentages being based upon the total polymeric content of the interpolymer.

8. The process which comprises mixing a biphenyl compound selected from the class consisting of vinylbiphenyl, vinylchlorobiphenyl and vinylfluorobiphenyl with a compound selected from the class consisting of styrene, alpha-methylstyrene and alpha,para-dimethylstyrene so as to produce a mixture of polymerizable compounds, said mixture comprising from 5% to 95% by weight of said vinylbiphenyl compound and said other compound comprising at least 5%, and then polymerizing said mixture by the application of heat.

9. The process which consists of mixing from 5 to 95% styrene and from 5 to 95% para-vinylbiphenyl and then polymerizing said mixture by the application of heat.

10. The process which consists of mixing from 5 to 95% styrene and from 5 to 95% ortho-vinylbiphenyl and then polymerizing said mixture by the application of heat.

11. The process which consists of mixing from 5 to 95% styrene and from 5 to 95% meta-vinylbiphenyl and then polymerizing said mixture by the application of heat.

RAYMOND B. SEYMOUR.
JOHN MANN BUTLER.

REFERENCES CITED

The following references are of record in the file of this patent:

UNITED STATES PATENTS

| Number | Name | Date |
| --- | --- | --- |
| 2,047,398 | Voss et al. | July 14, 1936 |
| 2,297,723 | Soday | Oct. 6, 1942 |
| 2,302,464 | Palmer et al. | Nov. 17, 1942 |
| 2,383,921 | Soday | Aug. 28, 1945 |
| 2,383,922 | Soday | Aug. 28, 1945 |

FOREIGN PATENTS

| Number | Country | Date |
| --- | --- | --- |
| 132,042 | Austria | Sept. 15, 1932 |
| 204,859 | Switzerland | Aug. 16, 1939 |
| 11,688 | Australia | Aug. 20, 1942 |